Oct. 5, 1965 D. J. KLEIN 3,210,481
HOMING SELECTOR SWITCH
Filed Aug. 6, 1963 3 Sheets-Sheet 1

INVENTOR
DIETRICH J. KLEIN

BY Watson, Cole, Grindle & Watson
ATTORNEYS

Oct. 5, 1965 D. J. KLEIN 3,210,481

HOMING SELECTOR SWITCH

Filed Aug. 6, 1963 3 Sheets-Sheet 2

INVENTOR
DIETRICH J. KLEIN

BY Watson, Cole, Grindle & Watson
ATTORNEYS

Oct. 5, 1965 D. J. KLEIN 3,210,481

HOMING SELECTOR SWITCH

Filed Aug. 6, 1963 3 Sheets-Sheet 3

INVENTOR
DIETRICH J. KLEIN

BY Watson, Cole, Grindle & Watson

ATTORNEYS

－ United States Patent Office 3,210,481
Patented Oct. 5, 1965

3,210,481
HOMING SELECTOR SWITCH

Dietrich J. Klein, Charlottesville, Va., assignor to Stromberg-Carlson Corporation, a corporation of Delaware
Filed Aug. 6, 1963, Ser. No. 300,315
2 Claims. (Cl. 179—99)

This invention relates generally to switches and more specifically it relates to homing switches useful in telephone switching systems.

A certain class of telephone intercommunication equipment provides for the connection of a telephone set at one station to communicate with a set at a plurality of further stations responsive to the operator's positioning of a selector switch. The switching circuits of this telephone system provide for a home position on the selector switch which conditions the station to receive calls. Normally, the operator will make his call to a selected station by manually indexing the switch, and after he has completed the call will return the switch to home position so that incoming calls may be received. This type of system is used, for example, on ships.

Because of human operations in the above systems, however, the switch is frequently left in a station position, or may be improperly homed because of careless manual indexing.

Accordingly, it is an object of this invention to provide a homing switch suitable for use in such telephone systems.

Another object of the invention is to provide an improved semi-automatic telephone set eliminating the above mentioned malfunctions.

Therefore, in accordance with the invention there is provided a rotary homing selector switch which is manually operable to select a plurality of detented switching positions. A torsion spring tends to rotate the rotary shaft of the switch to a homing position which has a stop to prevent further rotation. The detent mechanism, which holds the manually selected position against rotation by urging the torsion spring when a manual selection is made, may be selectively released to accomplish the automatic homing operation.

In accordance with an embodiment of the invention, the homing operation is triggered as the handset of the telephone is replaced. Thus, a semi-automatic telephone station operates to return to a call-receiving condition without operator intervention.

The invention is described in more detail along with further features and objects with reference to the accompanying drawings, wherein.

Figure 1:
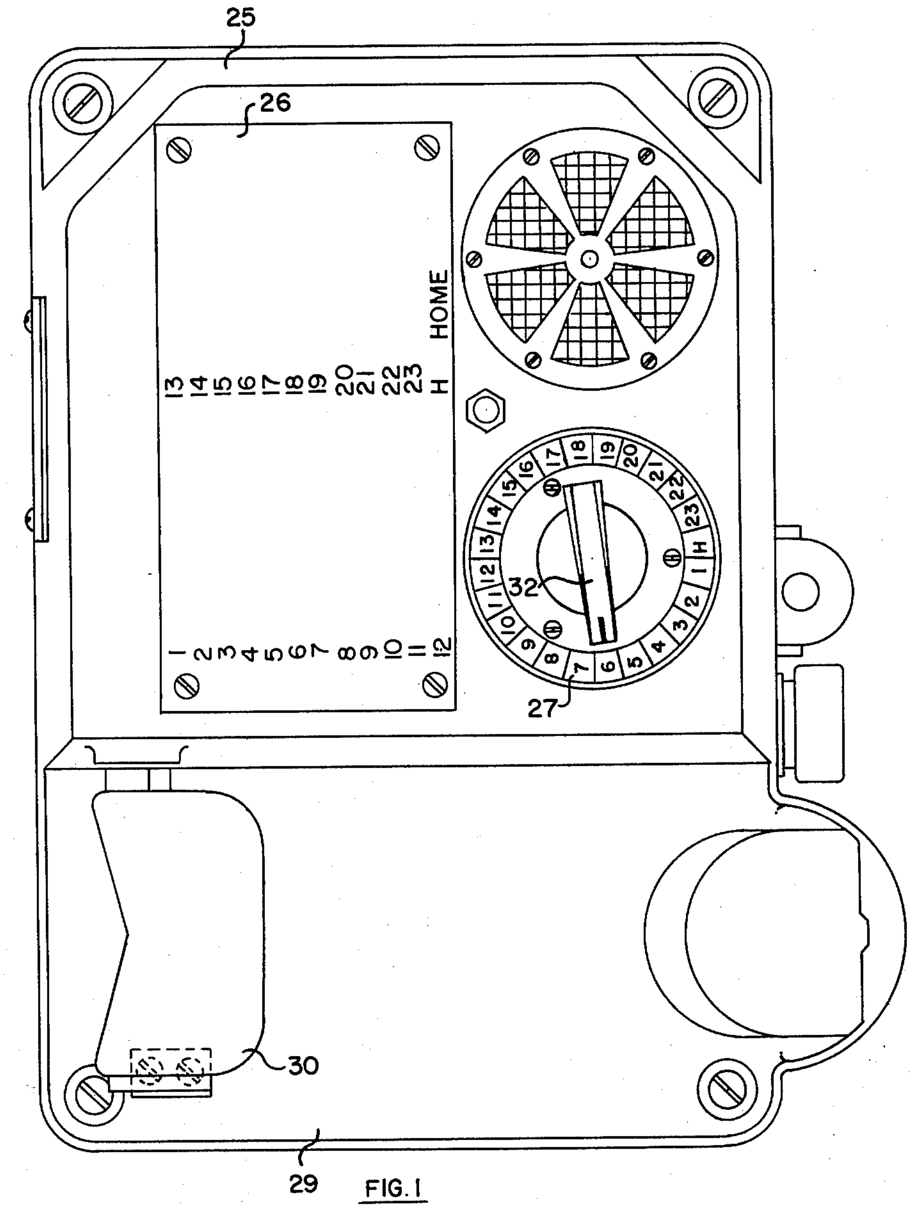
FIGURE 1 is a front panel view of a telephone station set constructed in accordance with an embodiment of the invention.

The telephone station set 25 is constructed for shipboard communication purposes, and may be connected to not more than twenty-two stations other than the local station in use identified by the twenty-three positions on panel 26. When a call is made, for example, to station 6 as shown by the indexed position of selector dial 27 of wafer switch 28, the operator removes the handset (not shown) from the receptacle 29 by pushing up the pivoted cup 30. Then the operator selects station 6 by rotating the selector knob 32 affixed to the shaft 31 of switch 28 from the homing position H to station 6. This conditions the telephone set to place a call to the selected station in accordance with telephone switching circuitry, not shown, in order to better illustrate the nature of the present invention and because the switching circuitry of the telephone system is entirely conventional. There is a provision in such conventional switching circuits that after each use, the switch 28 must be returned to the home position H to condition the station to receive incoming calls. Thus, in conventional sets the operator must remember to return the switch to H in a final manual operation upon completion of the call, and must pay close attention that the switch is detented properly and is not in an adjacent switching position.

Figure 2:
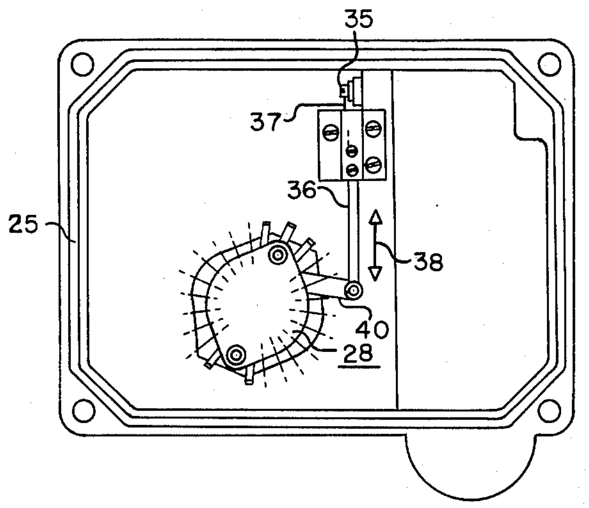
FIGURE 2 is a back view on a reduced scale of the panel of FIGURE 1, showing the switching selector arrangement afforded by the invention.

Accordingly, switch 28 is a special switch which provides automatic return to the home position H when the handset is returned to receptacle 29 and the pivoted cup 30 is operated. As shown in FIGURE 2, the pivot shaft 35 of cup 30 is coupled to an actuating rod 36 by an intermediate linkage 37 so that the rod moves vertically as shown by arrow 38 in response to the motion of the pivoted cup 30 as the handset is returned to the receptacle 29. The cup 30 is in its downward position, as shown, when the handset is removed so that the switch homing mechanism is triggered only upon the return of the handset when the cup is in its uppermost position.

Figure 4:
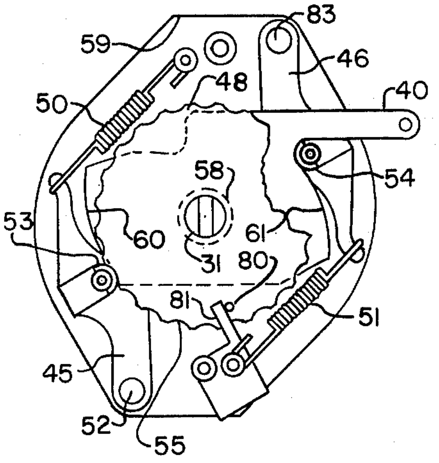
FIGURE 4 is a section view of the switch of FIGURE 3 taken along lines 4—4 and partly broken away.
Figure 5:
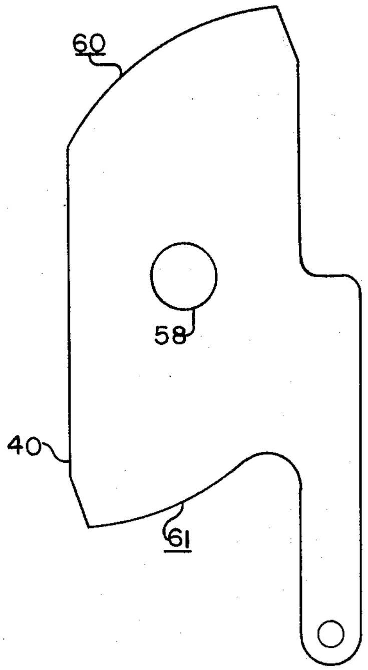
FIGURES 5 through 7 are sketches showing constructional details of the switch assembly of FIGURE 3.

Motion of rod 36 pivots a cam 40 (shown in FIGURE 5) about the shaft 31 of the switch 28 to disengage the detent mechanism shown in FIGURE 4.

Figure 3:
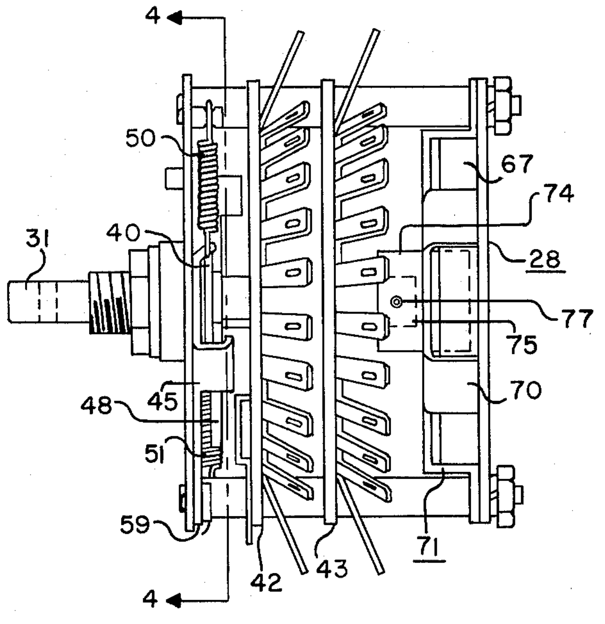
FIGURE 3 is a side view of a wafer switch constructed in accordance with the teachings of the invention.

The switch assembly shown in FIGURE 3 has appropriate fixed switching wafers 42, 43 which cooperate with rotary mounted mating switch contact structure positioned by the indexing shaft 31. As the shaft 31 is rotated the pivoted detent assemblies 45, 46 engage a detent plate 48 rotatable with shaft 31 to thereby define a plurality of switching positions. Manual force on selector knob 32 serves to pivot these detent assemblies 45, 46 against pressure of springs 50, 51 about pivot axes 52, 83 to engage cams 53, 54 in selected scallops 55 on the detent plate 48.

In accordance with this invention, the homing trigger cam plate 40 rotates about the switch shaft 31 by means of aperture 58, as located between the detent plate 48 and switch face plate 59. As the cam plate 40 is pivoted, the opposite cam surfaces 60, 61 pivot back the detent assemblies 45 and 46 to disengage detent rollers 53 and 54 from the scallops 55 on detent plate 48. Thus, the switch shaft 31 is no longer detained in position and is free to rotate.

Figure 6:
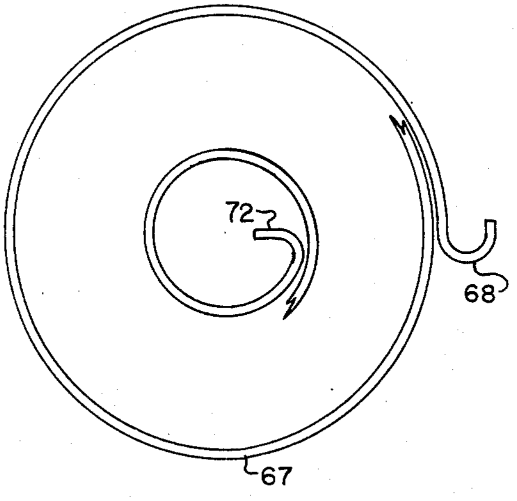
Figure 7:
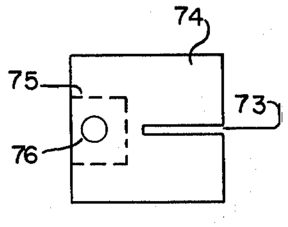

To send the switch to the home position, a torsion spring 67 (FIGURE 6) is provided with an outer hook 68 which may be anchored to the frame of the switch, such as to a leg 70 of the spring enclosure spider 71. The inner hook 72 engages a slot 73 of a coupling member 74 (FIGURE 7) which engages the rectangular end of switch shaft 31 by means of the mating internal channel 75. A roll pin 77 may hold the coupling member 74 on the shaft 31 through hole 76. The shaft is urged by spring 67 towards home position H at which it is stopped by pin 80 engaging stop 81 (FIGURE 4). The force of the spring is chosen such that it is readily overcome by manual positioning of selector knob 32, and such that it does not overcome the force of the detent mechanism until released by cam 40.

Thus, it may be seen that rotation of trigger cam 40 releases the detent mechanism to permit the spring to return the contact structure to the home position H under influence of the torsion spring 67. The switch may be selectively homed at will by movement of trigger cam 40 and is usable in any environment where the homing operation is desired, but has particular advantage when triggered by rod 36 is response to the replacement of a handset in a station-to-station telephone system of the type described. Novel features of the switching apparatus described as afforded by this invention are defined with particularity in the following claims.

I claim:

1. A rotary switch assembly comprising in combination, a pair of mating switching contact assemblies, one of which is rotated by an indexing shaft, a detent mechanism defining a plurality of switching positions including a notched detent plate rotatable about said indexing shaft and a pair of opposed stop members spring biased to engage notches in the detent plate, stop means defining a home switch position, torsional biasing means urging the shaft toward said home position with less force than required to overcome the detenting action of said stop members, and selectably operable means for releasing the detent mechanism to permit the torsional biasing means to return the switching contacts to the home position comprising a homing cam plate journaled for rotation about said shaft which engages both said stop members in one angular position to remove them from said notches and which in another angular position permits the stops to engage the notches, the homing cam plate having a cam surface that simultaneously removes the stops as it is rotated from said one angular position to the other.

2. The switch as defined in claim 1 in combination with a telephone set having a handset and a hook lever for holding the handset including means for rotating the homing cam plate between said two angular positions by a change of position of the hook lever, the stops being removed from said notches when said handset is in place on said hook lever and engaging the notches when said handset is removed from the hook lever.

References Cited by the Examiner

UNITED STATES PATENTS

| | | | |
|---|---|---|---|
| 644,204 | 2/00 | Keller | 179—99 |
| 794,134 | 7/05 | Weman et al. | 179—99 |
| 2,465,397 | 3/49 | Powell et al. | 179—90 |
| 2,750,459 | 6/56 | Hosea et al. | 200—153 |

BERNARD A. GILHEANY, *Primary Examiner.*

ROBERT K. SCHAEFER, *Examiner.*